(12) United States Patent
Yenganti et al.

(10) Patent No.: US 9,560,593 B2
(45) Date of Patent: Jan. 31, 2017

(54) MERGING OF INDEPENDENT BASIC SERVICE SET (IBSS) POWER SAVE (PS) ENABLED NETWORKS

(71) Applicant: QUALCOMM Incorporated, San Diego, CA (US)

(72) Inventors: Pradeep Kumar Yenganti, Sunnyvale, CA (US); Ravi Kumar Konda, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 14/705,177

(22) Filed: May 6, 2015

(65) Prior Publication Data

US 2015/0327203 A1 Nov. 12, 2015

Related U.S. Application Data

(60) Provisional application No. 61/988,947, filed on May 6, 2014.

(51) Int. Cl.
*H04J 3/00* (2006.01)
*H04W 52/02* (2009.01)
*H04W 56/00* (2009.01)
*H04W 72/04* (2009.01)
*H04W 84/18* (2009.01)

(52) U.S. Cl.
CPC ..... *H04W 52/0229* (2013.01); *H04W 52/0216* (2013.01); *H04W 52/0219* (2013.01); *H04W 56/0015* (2013.01); *H04W 72/0446* (2013.01); *H04W 84/18* (2013.01); *Y02B 60/50* (2013.01)

(58) Field of Classification Search
USPC .............................................. 455/552.1, 41.2
See application file for complete search history.

(56) References Cited

U.S. PATENT DOCUMENTS

| 8,223,662 | B2* | 7/2012 | Deshpande | ....... H04W 52/0216 370/252 |
| 2007/0050523 | A1* | 3/2007 | Emeott | ............... H04W 56/001 709/248 |
| 2013/0224568 | A1* | 8/2013 | Fukunaga | ........... H01M 2/0277 429/160 |
| 2014/0065964 | A1* | 3/2014 | Turunen | ................ H04W 8/005 455/41.2 |
| 2015/0223081 | A1* | 8/2015 | Kim | .................... H04W 76/028 370/338 |

* cited by examiner

*Primary Examiner* — Duc C Ho
(74) *Attorney, Agent, or Firm* — Holland & Hart LLP

(57) ABSTRACT

Methods, systems, and devices are described for merging two or more power save enabled independent basic service set (IBSS) networks. In one example, a method includes receiving, at a station of a first IBSS network, a first beacon from a second IBSS network, wherein the first beacon identifies a timing synchronization function (TSF) of the second IBSS network. The method may further include transmitting, by the station, a second beacon at a next target beacon transmission time (TBTT) of the first IBSS network based on a comparison of the TSF of the second IBSS network with a TSF stored by the station, wherein the second beacon identifies a TSF of the second IBSS network.

20 Claims, 10 Drawing Sheets

MERGING OF INDEPENDENT BASIC SERVICE SET (IBSS) POWER SAVE (PS) ENABLED NETWORKS

CROSS REFERENCES

The present application for patent claims priority to U.S. Provisional Patent Application No. 61/988,947 by Yenganti et al., entitled "Merging of Independent Base Service Set (IBSS) Power Save (PS) Enabled Networks," filed May 6, 2014, assigned to the assignee hereof, and expressly incorporated by reference herein.

BACKGROUND

The following relates generally to wireless communication, and more specifically to wireless communication using an independent basic service set (IBSS). In particular, the following relates to merging IBSS power save enabled networks. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of devices (or nodes or stations). An ad-hoc wireless network may include a number of stations that communicate over a wireless local area network (WLAN) or Wi-Fi spectrum in the absence of a controlling access point. Successful data transmission between different stations in an ad-hoc wireless network may be predicated on synchronizing the timing among the stations within the network. Timing synchronization among stations of an ad-hoc wireless network may be accomplished using beacons which carry timing information to the different stations of the ad-hoc wireless network.

In some cases, a first ad-hoc wireless network may merge with a second wireless ad-hoc wireless network. Prior to the merger, the stations of the first ad-hoc wireless network may not be synchronized with the stations of the second ad-hoc wireless network. Thus, merging the ad-hoc wireless networks may include synchronizing the timing of all stations in both ad-hoc wireless networks.

SUMMARY

The described features generally relate to one or more improved systems, methods, and/or apparatuses for merging power-save enabled IBSS networks. Techniques for merging two or more nearby IBSS networks that share a same service set identifier (SSID). An active station of a IBSS network may update a timing synchronization function (TSF) stored at the station when the station receives a beacon from a station which is not currently a part of the IBSS network of the station but has the same SSID as the IBSS network of the station. The active station may transmit a second beacon that identifies the TSF of the other IBSS network. All other stations in the IBSS network may receive the second beacon and may be able to use information included with the beacon to join the other IBSS network.

In a first set of illustrative examples, a method for wireless communication is described. In one configuration, the method includes receiving, at a station of a first IBSS network, a first beacon from a second IBSS network, wherein the first beacon identifies a TSF of the second IBSS network. The method also includes transmitting, by the station, a second beacon at a next target beacon transmission time (TBTT) of the first IBSS network based on a comparison of the TSF of the second IBSS network with a TSF stored by the station, wherein the second beacon identifies a TSF of the second IBSS network.

Some examples of the method further include adjusting a backoff window of the station at the next TBTT of the first IBSS network based on the comparison of the TSF of the second IBSS network with the TSF stored by the station. In other examples, the method further includes transmitting the second beacon concurrent to a transmission of a third beacon by a second station of the first IBSS network.

In some examples of the method, comparison of the TSF of the second IBSS network with the TSF stored by the station further includes determining, by the station, that the TSF of the second IBSS network is older than the TSF stored by the station by a threshold duration. The method may further include adjusting the TSF stored by the station to an adjusted TSF, wherein the adjusted TSF matches the TSF of the second IBSS network. In examples where the station is a first station, the method may further include receiving, by the first station, a third beacon from a second station at the TBTT of the first IBSS network, wherein the third beacon identifies the TSF stored by the first station. The method may also include maintaining the adjusted TSF of the first station. In other examples where the station is a first station, the method includes receiving, at a second station of the first IBSS network, the second beacon and adjusting, at the second station, a TSF of the second station to match the TSF of the second IBSS network.

In some examples of the method, the first IBSS network and the second IBSS network share one or both of a same service set identifier (SSID) and a same basic service set identifier (BSSID).

In a second set of illustrative examples, a device for wireless communication is described. In one configuration the device may include a receiver at a station of a first IBSS network configured to receive a first beacon from a second IBSS network, wherein the first beacon identifies a timing synchronization function (TSF) of the second IBSS network. The device may further include a transmitter configured to transmit a second beacon at a next TBTT of the first IBSS network based on a comparison of the TSF of the second IBSS network with a TSF stored by the station, wherein the second beacon identifies a TSF of the second IBSS network.

In a third set of illustrative examples, another apparatus for wireless communication is described. In one configuration, the apparatus may include means for receiving, at a station of a first IBSS network, a first beacon from a second IBSS network, wherein the first beacon identifies a TSF of the second IBSS network. The apparatus may further include means for transmitting, by the station, a second beacon at a next TBTT of the first IBSS network based on a comparison of the TSF of the second IBSS network with a TSF stored by the station, wherein the second beacon identifies a TSF of the second IBSS network.

In a fourth set of illustrative examples, a computer program product for communication by a wireless communication apparatus in a wireless communication system is described. In one configuration, the computer program product may include a non-transitory computer-readable medium storing instructions executable by a processor to cause the wireless communication apparatus to receive a first beacon from a first IBSS network, wherein the wireless communication apparatus is of a second IBSS network, wherein the first beacon identifies a TSF of the first IBSS network. The non-transitory computer-readable medium may further store instructions executable by the processor to cause the wireless communication apparatus to transmit a second beacon at a next TBTT of the second IBSS network based on a comparison of the TSF of the first IBSS network with a TSF stored by the wireless communication apparatus, wherein the second beacon identifies a TSF of the first IBSS network.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
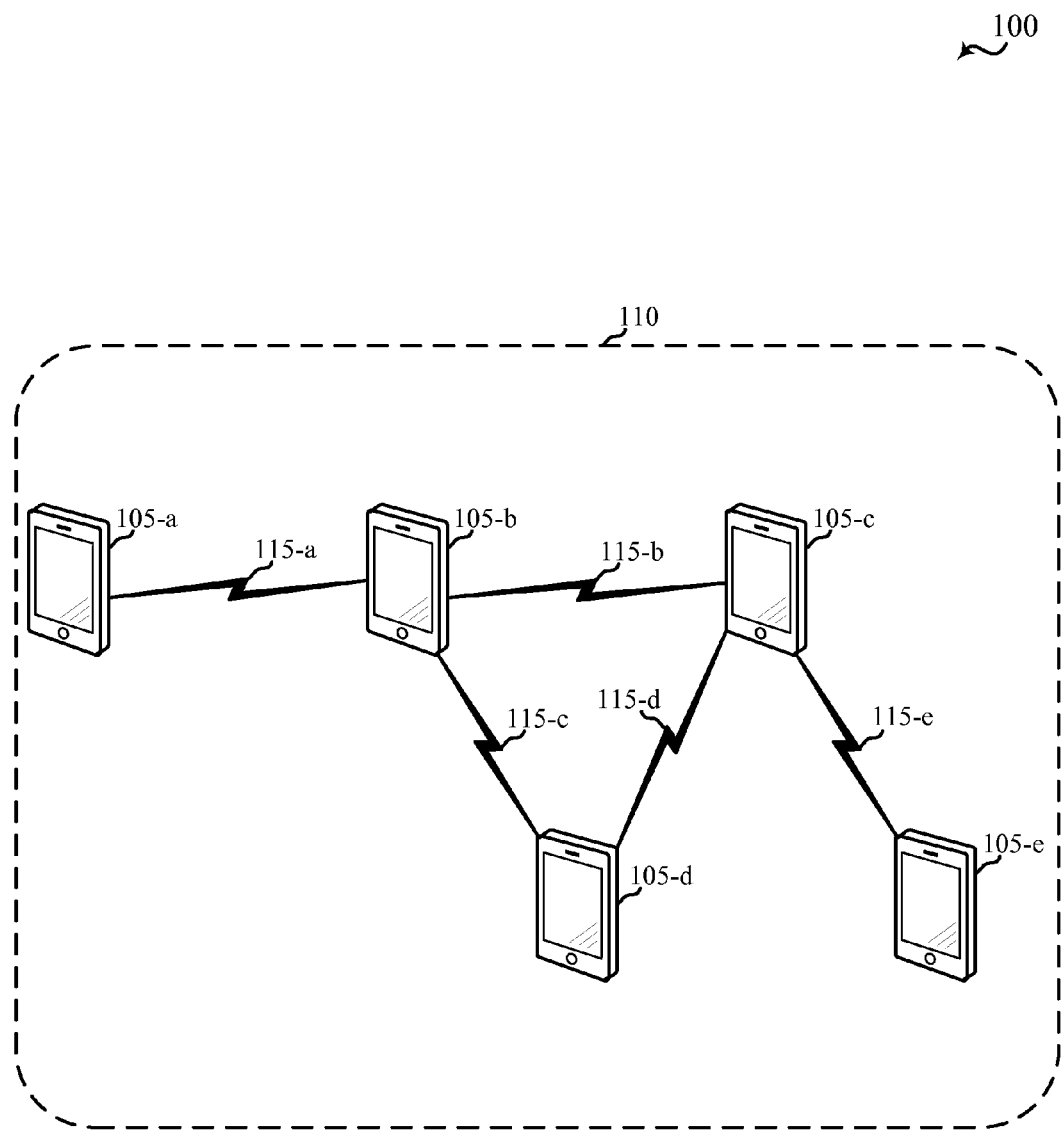
FIG. 1 shows a diagram of an independent basic service set (IBSS) network, in accordance with various embodiments.

The present disclosure describes techniques for synchronizing timing information among stations during a merger of ad-hoc wireless networks. As noted above, in some cases, a first ad-hoc wireless network may merge with a second ad-hoc wireless network. Prior to the merger, the stations of each individual ad-hoc wireless network may be synchronized with each other, but the stations of the first ad-hoc wireless network may not be synchronized with the stations of the second ad-hoc wireless network. Thus, merging the ad-hoc wireless networks may involve synchronizing the timing of all stations in both ad-hoc wireless networks.

The use of power saving modes on one or both of the ad-hoc wireless networks may complicate the distribution of timing information among the stations to perform this synchronization. For example, only a subset of the stations of the first ad-hoc wireless network may be awake and actively listening when beacons containing timing information from the second ad-hoc wireless network are transmitted, and vice versa. Under these circumstances, the distribution of timing information to synchronize the merging ad-hoc wireless networks may be delayed.

To reduce the delays associated with distributing timing information among merging ad-hoc wireless networks using power saving modes, the conditions under which a station transmits a beacon may be modified. For example, where a first ad-hoc wireless network is to be merged with a second ad-hoc wireless network, a station of the first ad-hoc wireless network that is awake and receives a beacon containing timing information from a second ad-hoc wireless network may transmit a second beacon containing the timing information from the second ad-hoc wireless network.

The station may transmit the second beacon at the next available beacon opportunity for the first ad-hoc wireless network, even if the station would not have otherwise transmitted a beacon at the next beacon opportunity for the first ad-hoc wireless network (e.g., due to backoff requirements). For example, the backoff window of the station may be adjusted or ignored at the next beacon opportunity for the first ad-hoc wireless network to allow the station to distribute the timing information from the second ad-hoc wireless network as soon as possible.

In this way, the timing information from the second ad-hoc wireless network may be distributed to the stations of the first ad-hoc wireless network at a time when each station of the first ad-hoc wireless network is awake and actively listening. Accordingly, delays associated with synchronizing timing information among the stations of the merging ad-hoc wireless networks may be reduced.

In certain examples, the first and second ad-hoc wireless networks may be independent basic service set (IBSS) networks, and the timing information may include a timing synchronization function (TSF) value, and the next available beacon opportunity of first ad-hoc wireless network may be a next target beacon transmission time (TBTT) of the first ad-hoc wireless network. For example, a station of a first IBSS network may receive a first beacon from a second IBSS network, the first beacon identifying a TSF value of the second IBSS network. The station may compare the TSF value of the second IBSS network to a TSF locally stored by the station. If the TSF of the second IBSS network is greater than the TSF value stored by the station, the station may transmit a second beacon to the stations of the first IBSS at a next TBTT of the first IBSS network. The second beacon may provide the TSF of the second IBSS network to the stations of the first IBSS network.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, an ad hoc network of wireless devices may allow the wireless devices to communicate with each other in the absence of a controlling access point. One example of an ad hoc wireless network is an independent basic service set (IBSS) network 110. An IBSS network may conform to the Institute of Electrical and Electronics (IEEE) 802.11 family of standards. Additionally or alternatively, a wireless ad hoc network may conform to one or more other wireless standards.

By way of example, the IBSS network 110 shown in FIG. 1 includes five stations (or nodes or devices) 105-a, 105-b, 105-c, 105-d, and/or 105-e. In some cases, the IBSS network may include more or fewer stations 105. Each station 105 may be stationary or mobile and may take any of a number of forms. For example, a station 105 may be a cellular phone, a personal digital assistant (PDA), a tablet computer, a laptop computer, a wearable item such as a watch or glasses, etc.

The stations of the IBSS network 110 may communicate with one another via a number of communication links 115-a, 115-b, 115-c, 115-d, and/or 115-e. Some devices may communicate with each other directly (e.g., station 105-a may communicate with station 105-b via communication link 115-a) and other devices may communicate with each other indirectly (e.g., station 105-a may communicate with station 105-d via station 105-b and communication links 115-a and 115-c).

The stations 105 of the IBSS network 110 may each transmit a beacon at a TBTT based on a TSF implemented via a distributed algorithm. In turn, each of the stations 105 within the IBSS network 110 may transmit a beacon identifying an SSID and a basic service set identifier (BSSID) of the IBSS network 110. The beacon may identify the SSID, BSSID, and the TSF of the IBSS network 110. Any of the stations 105 within the IBSS network 110 may backoff for beaconing at the TBTT and cancel a beacon transmission for that TBTT if the stations receive a beacon from any peer station at the TBTT. Each station 105 in the IBSS network 110 may adopt the TSF value received from any beacon frame or probe response from the IBSS network 110 of which the station 105 is a member and which has a TSF value later than the TSF timer stored by the station 105.

Figure 2:
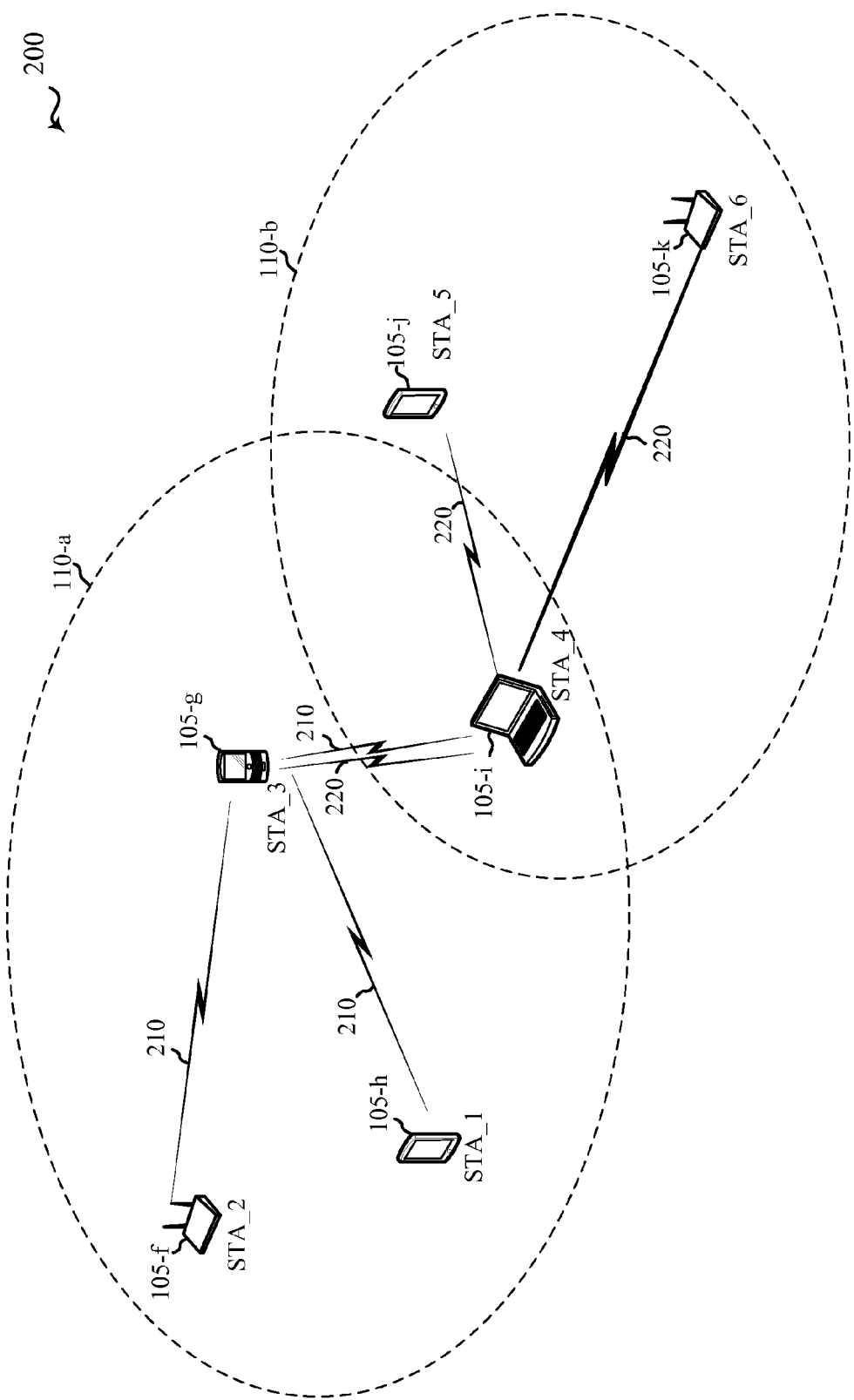
FIG. 2 shows a diagram of two example IBSS networks merging, in accordance with various embodiments.

Turning now to FIG. 2, there is shown a diagram 200 of two example IBSS networks 110 merging, in accordance with various embodiments. A first IBSS network 110-a is shown to which a number of stations (or nodes or devices) 105-f, 105-g, and 105-h belong. A second IBSS network 110-b is also shown to which a number of stations 105-i, 105-j, and 105-k belong. In other examples, the IBSS network 110-a and/or the IBSS network 110-b may include more or less devices. In some embodiments, the stations 105 may be examples of one or more aspects of the stations 105 described with reference to FIG. 1. In further examples, the IBSS networks 110 may be examples of one or more aspects of the IBSS network 110 described with reference to FIG. 1.

In situations where the IBSS networks 110 share a same SSID, the IBSS networks 110 may merge into a single IBSS network if the IBSS networks 110 come within range of each other. As shown in FIG. 2, the IBSS networks 110 are within range of each other. For example, at least one station, such as the station 105-i of the IBSS network 110-b is within range of (e.g., visible to) at least the station 105-g of the IBSS network 110-a. An example situation may be if the station 105-g moved closer to the IBSS network 110-b and came within range of the station 105-i.

When power save is enabled in the IBSS network 110, only the station 105 which beaconed at a current TBTT may stay awake during a current beacon interval (i.e., the time period between two beacons or TBTTs), while the other stations 105 enter a power collapse mode. However, all stations 105 within the IBSS network 110 may be awake for the duration of an announcement traffic indication message (ATIM) window immediately following transmission of the beacon beginning the current beacon interval. Only the station 105 which beaconed at a current TBTT may stay awake during a current beacon interval. As long as idle conditions are met, all other stations 105 that are part of the PS-enabled IBSS network 110 may enter power collapse after the current ATIM window.

In the example of FIG. 2, the station 105-g of the IBSS network 110-a has transmitted a beacon 210 at a TBTT of the IBSS network 110-a. The beacon 210 may include information about the IBSS network 110-a, such as a TSF of the IBSS network 110-a. Any stations within range of the station 105-g, such as the stations 105-f, 105-h, and 105-i, may receive the beacon 210, such as the stations 105-f, 105-h, and 105-i. Because the station 105-i is within range of the station 105-g, the station 105-i may receive the beacon 210 as long as the station 105-i is operating in a power active state (i.e., is awake and actively listening) when the beacon 210 is broadcast. If the station 105-i receives the beacon 210 and determines that the SSID of the beacon 210 is the same as the SSID of the IBSS network 110-b, the station 105-i may decide to join the IBSS network 110-a. The station 105-i may transmit a beacon 220 at a TBTT of the IBSS network 110-b in order to signal the merging. Once each station 105-j and 105-k has received the beacon 220, the two IBSS networks 110 may have merged into a single IBSS network.

Thus, two or more IBSS networks 110 that share a same SSID and come within proximity of each other (e.g., are visible to each other) may merge within a single beacon interval. An active station 105 of a IBSS network 110 may update a TSF stored at the station 105 when the station 105 receives a beacon from a station which is not currently a part of the IBSS network 110 but has the same SSID as the IBSS network 110. The active station 105 may transmit a second beacon at the next TBTT of the IBSS network 110 that identifies the TSF of the other IBSS network. All other stations 105 in the IBSS network 110 may receive the second beacon and may be able to use information included with the beacon to join the other IBSS network. Thus, all peer stations 105 of the IBSS network 110 may be able to merge with another IBSS network within a single beacon interval.

Figure 3:
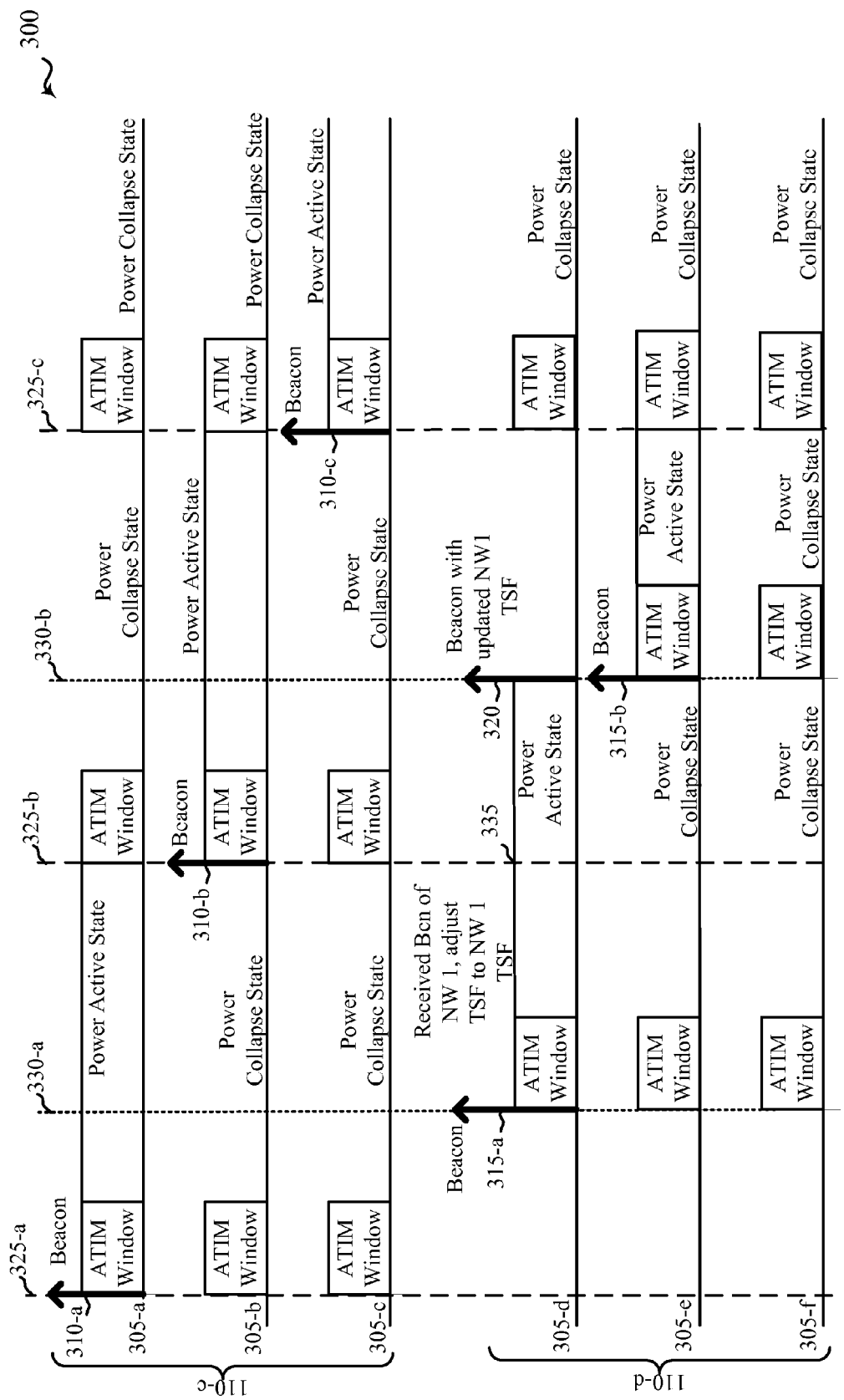
FIG. 3 shows a timing diagram of example beacon emissions for two merging IBSS networks, in accordance with various embodiments.

FIG. 3 shows a timing diagram 300 of example beacon transmissions for two merging IBSS networks, in accordance with various embodiments. A first IBSS network 110-c is shown to which a number of stations (or nodes or devices) 305-a, 305-b, and 305-c belong. A second IBSS network 110-d is also shown to which a number of stations 305-d, 305-e, and 305-f belong. In other examples, the IBSS network 110-c and/or the IBSS network 110-d may include more or less devices. In some examples, the IBSS networks 110 may be examples of one or more aspects of the IBSS networks 110 described with reference to FIGS. 1 and/or 2. In further examples, the stations 305 may be examples of one or more aspects of the stations 105 described with reference to FIGS. 1 and/or 2. As illustrated in FIG. 3, the IBSS network 110-*c* is referred to as NW1 and the IBSS network 110-*d* is referred to as NW2.

Each station 305 may be in a power active state during an ATIM window for the respective IBSS network 110. As shown in FIG. 3, the station 305-*a* broadcasts a beacon 310-*a* at the first instance of TBTT of NW1 325-*a* of the IBSS network 110-*c*. The beacon 310-*a* may identify a TSF of the IBSS network 110-*c*.

In this example, while one of the stations 305-*d*, 305-*e*, and 305-*f* may have been in a power active state at the first instance of TBTT of NW1 325-*a*, none of the stations 305-*d*, 305-*e*, and 305-*f* received the beacon 310-*a*. The stations 305-*d*, 305-*e*, and 305-*f* may not have received the beacon 310-*a* because the stations 305-*d*, 305-*e*, and 305-*f* were either out of range of the beacon 310-*a* or were in a power collapse state. After the ATIM window of the IBSS network 110-*c*, the stations 305-*b* and 305-*c* enter the power collapse state. The station 305-*a*, having broadcast the beacon 310-*a*, may remain in the power active state.

At the first instance of TBTT of NW2 330-*a*, each station 305-*d*, 305-*e*, and 305-*f* may be in the power active state for the duration of the ATIM window. In this example, the station 305-*d* may be scheduled to broadcast a beacon 315-*a* at the first instance of TBTT of NW2 330-*a*. The beacon 315-*a* may identify a TSF of the IBSS network 110-*d*. The stations 305-*e* and 305-*f* may receive the beacon 315-*a*. Once the ATIM window passes, the stations 305-*e* and 305-*f* may enter the power collapse state while the station 305-*d* remains in the power active state.

At a second instance of TBTT of NW1 325-*b*, each of the stations 305-*a*, 305-*b*, and 305-*c* may be in the power active mode for at least the duration of the ATIM window. At the second instance of TBTT of NW1 325-*b*, the station 305-*b* is scheduled to transmit a beacon 310-*b*. The beacon 310-*b* may identify the TSF of the IBSS network 110-*c*.

The station 305-*d* is in the power active state at the second instance of TBTT of NW1 325-*b* and is visible to the station 305-*b*. Thus, the station 305-*d* receives the beacon 310-*b*. Because the IBSS network 110-*c* shares the same SSID as the IBSS network 110-*d*, the station 305-*d* adjusts a TSF stored at the station 305-*d* to match the TSF of the IBSS network 110-*d*. However, the station 305-*d* retains the knowledge of the next instance of TBTT of the IBSS network 110-*d* (i.e., a second instance of TBTT of NW2 330-*b*) in order to send a beacon out at that time identifying the TSF of the IBSS network 110-*c*. Thus, the station 305-*d* may update the TSF of the station 305-*d* to match the stored TSF of the IBSS network 110-*c* at time 335.

The station 305-*d* may transmit a beacon 320 at the second instance of TBTT of NW2 330-*b* that identifies the TSF of the IBSS network 110-*c*. The station 305-*d* may transmit the beacon 320 within one beacon interval of receiving the beacon 310-*b*. At the second instance of TBTT of NW2 330-*b*, all stations of the IBSS network 110-*d* may be in the power active state. The stations 305-*e* and 305-*f* may receive the beacon 320. The station 305-*e* may adjust a TSF stored at the station 305-*e* to the TSF of the IBSS network 110-*c* identified in the beacon 320. Likewise, the station 305-*f* may adjust a TSF stored at the station 305-*f* to the TSF of the IBSS network 110-*c* identified in the beacon 320. The stations 305-*e* and 305-*f* may update the TSF regardless of whether the stations 305-*e* and 305-*f* were scheduled to send out a beacon at the second instance of the TBTT of NW2 330-*b*. For example, as shown in FIG. 3, the station 305-*e* broadcasts a beacon 315-*b* at the scheduled time, the second instance of the TBTT of NW2 330-*b*. The beacon 315-*b* may still identify the TSF of the IBSS network 110-*d*. If the station 305-*e* is in the active power state when the station 305-*d* transmits the beacon 320, the station 305-*e* may not update the stored TSF the beacon 315-*b* because the beacon 315-*b* identifies the same TSF as the IBSS network 110-*d*.

In some examples, the station 305-*b* may transmit the beacon 310-*b* during the ATIM window of the IBSS network 110-*d*. During the ATIM window of the IBSS network 110-*d*, every station 305-*d*, 305-*e*, and 305-*f* are in the power active state. Of those stations 305-*d*, 305-*e*, and 305-*f* that are in range of the station 305-*b* and receives the beacon 310-*b*, those stations 305-*d*, 305-*e*, and 305-*f* may proceed in a similar fashion as described in the example where only the station 305-*d* is in the power active state.

For the beacon interval after the second instance of TBTT of NW2 330-*b*, the stations 305-*d*, 305-*e*, and 305-*f* may proceed with a previous procedure for power states. For example, the station 305-*d*, having transmitted the beacon 315-*a* in the first instance of TBTT of NW2 330-*a*, may enter into the power collapse state at the end of the ATIM window. The station 305-*e*, having transmitted the beacon 315-*b* in the second instance of TBTT of NW2 330-*b*, may remain in the power active state when the ATIM window expires. The station 305-*f* may enter the power collapse state when the ATIM window expires.

At a third instance of the TBTT of NW1 325-*c*, all the stations 305 may be merged into a single IBSS network. That is, once each of the stations in the IBSS network 110-*d* has adjusted the stored TSF to match the TSF of the IBSS network 110-*c*, the two IBSS networks 110 may have merged into a single IBSS network. Thus, all the stations 305 within the IBSS network 110-*d* may have joined the IBSS network 110-*c* within a single beacon interval. This merging may be much faster than situations where, for every beacon interval, only the station (e.g., the station 305-*d*) of the IBSS network 110-*d* that is awake (e.g., in the power active state) receives the beacon 310-*b* but does not transmit a new beacon (e.g., the beacon 320). In such circumstances, the station (e.g., the station 305-*d*) would adjust the TSF stored at that station but would not transmit a new beacon with the TSF of the IBSS network 110-*c*. Thus, for every beacon interval, only one station would align the stored TSF with the TSF of the IBSS network 110-*c* (i.e., join the IBSS network 110-*a*). For example, if there are 'N' stations in the IBSS network 110-*d*, it would take at least 'N' beacon intervals for all of the stations in the IBSS network 110-*d* to synchronize and join the IBSS network 110-*c*. This may lead to a disconnect between peers of the IBSS network 110-*d* because the stations 305-*d*, 305-*e*, and 305-*f* would no longer be synchronized. In contrast, techniques, devices, and systems described herein can merge two or more IBSS networks within a single beacon interval and without loss of peer connectedness.

Figure 4:
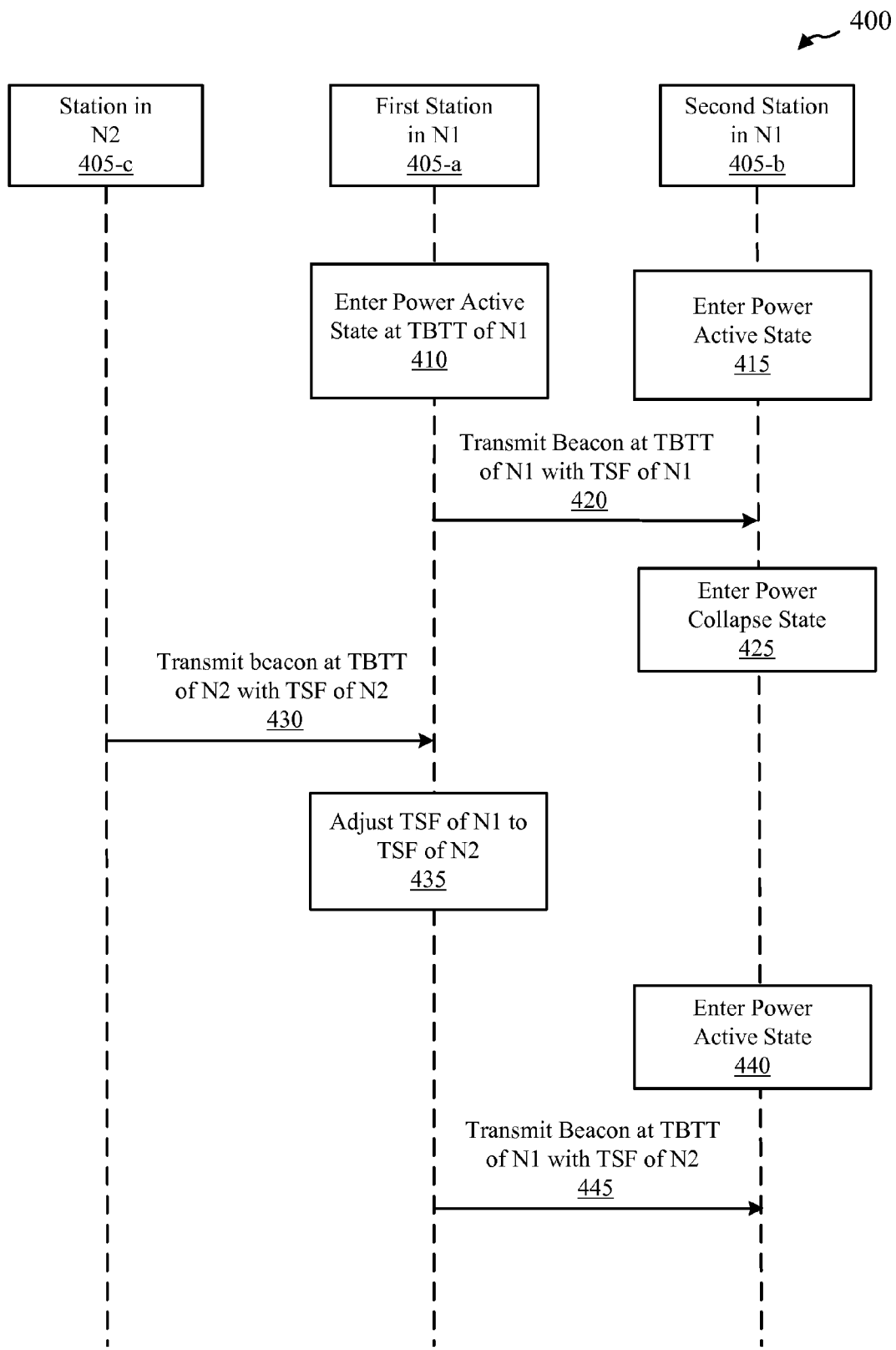
FIG. 4 shows a message flow diagram of an example of merging IBSS networks, in accordance with various embodiments.

FIG. 4 shows a message flow diagram 400 of an example of merging IBSS networks, in accordance with various embodiments. A first station 405-*a* and a second station 405-*b* may be part of a first network (N1). Another station 405-*c* may be part of a second network (N2). In some embodiments, the stations 405 may be examples of one or more aspects of the stations 105 and 305 described with reference to FIGS. 1, 2, and/or 3. The first network N1 and the second network N2 may be examples of one or more aspects of the IBSS networks 110 described with reference to FIGS. 1, 2, and/or 3.

By way of example, the message flow begins with the first station 405-*a* entering a power active state at approximately a TBTT of N1 from a power collapse state at block 410. The first station 405-*a* may wake up at TBTT because the TSF stored at the first station 405-*a* has scheduled it to broadcast a beacon. Similarly, the second station 405-*b* may enter a power active state at approximately the TBTT of N1 from a power collapse state at block 415. In other examples, one or more of the first station 405-*a* and second station 405-*b* was already in the power active state at TBTT. The states of the first station 405-*a* and the second station 405-*b* may enter the power active state at the ATIM. In some examples, every peer station of N1 enters the power active state at the ATIM.

Approximately at the ATIM, the first station 405-*a* transmits a beacon 420. The beacon 420 may be examples of the beacons 220 of FIG. 2 and FIG. 3. The first station 405-*a* may transmit the beacon 420 at the TBTT. The beacon 420 may include information relating to a TSF of N1. The second station 405-*b* may receive the beacon 420. At the end of the ATIM window, the second station 405-*b* may enter the power collapse state 425.

Sometime after the first station 405-*a* transmits the beacon 420, the station 405-*c* of N2 broadcasts a beacon 430. The beacon 430 may identify a TSF of N2. In this example, the first station 405-*a* is in power active state and within broadcasting range of the station 405-*c*, and thus receives the beacon 430. In other examples, other stations, such as the second station 405-*b*, may receive the beacon 430.

Based on the TSF of N2 identified in the beacon 430, the first station 405-*a* adjusts the TSF stored at the first station 405-*a* to match the TSF of N2 at block 435. Once the next beacon interval for N1 occurs (e.g., the next TBTT is reached), all stations, such as the second station 405-*b*, enter the power active state at block 440. The first station 405-*a* is already in power active state at the TBTT. At the TBTT, the first station 405-*a* transmits a beacon 445 at the TSF of N1 (e.g., the original TSF stored at the first station 405-*a*) that includes the TSF of N2. All stations of N1 receiving the beacon 445 may join N2.

Figure 5:
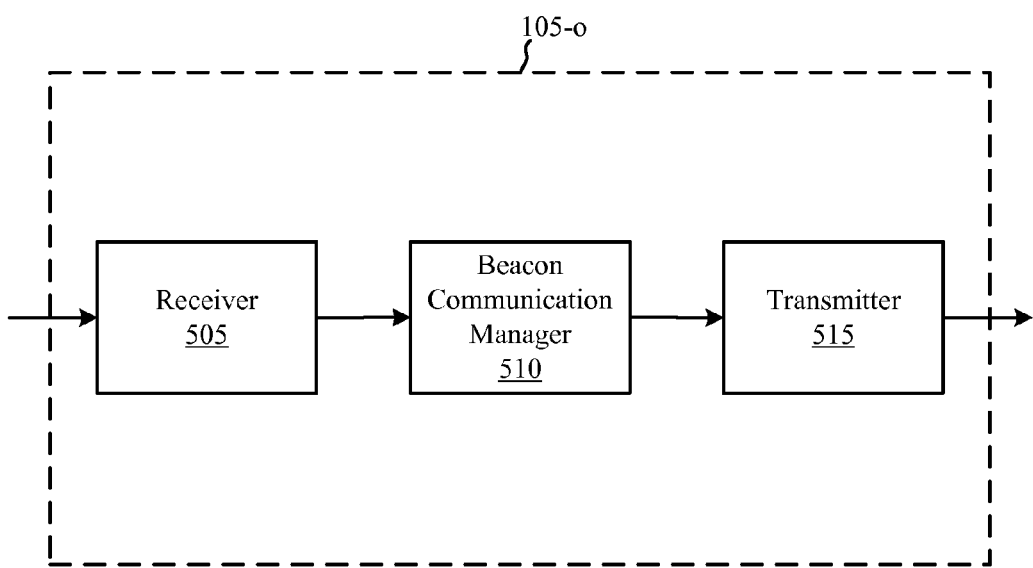
FIG. 5 shows a block diagram of an example of a station, in accordance with various embodiments.

FIG. 5 shows a block diagram 500 of an example of a station 105-1, in accordance with various embodiments. In some embodiments, the station 105-1 may be examples of one or more aspects of the stations 105 and 305 described with reference to FIGS. 1, 2, 3, and/or 4. The station 105-1 may also be a processor. The station 105-1 may include a receiver 505, a beacon communication manager 510, and/or a transmitter 515. Each of these components may be in communication with each other.

The components of the station 105-1 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver 505 may be or include a radio frequency (RF) receiver, such as an RF receiver operable to receive transmissions in a frequency spectrum used for WLAN communications. The receiver 505 may also, or alternately, include another type of RF receiver, such as a cellular receiver.

The receiver 505 may be used to receive various types of data and/or control signals (i.e., transmissions) over one or more communication links of a wireless communication system, such as one or more communication links of an IBSS network such as the IBSS networks 110 described with reference to FIGS. 1, 2, 3, and/or 4. The receiver 505 may also receive beacons, such as one or more beacons 210, 220, 310, 315, 320, 420, and/or 430 described with reference to FIGS. 1, 2, 3, and/or 4.

In some embodiments, the transmitter 515 may be or include an RF transmitter, such as an RF transmitter operable to transmit in a frequency spectrum used for WLAN communications. The transmitter 515 may also, or alternately, include another type of RF receiver, such as a cellular receiver.

The transmitter 515 may be used to transmit various types of data and/or control signals (i.e., transmissions) over one or more communication links of a wireless communication system, such as one or more communication links of an IBSS such as the IBSS networks 110 described with reference to FIGS. 1, 2, 3, and/or 4. The transmitter 515 may also transmit beacons, such as one or more beacons 210, 220, 310, 315, 320, 420, and/or 430 described with reference to FIGS. 1, 2, 3, and/or 4.

The beacon communication manager 510 may be used to manage beacon transmission and receipt for the station 105-1. In some cases, the station 105-1 may receive, at receiver 505, a beacon from an IBSS network different than the IBSS network of which the station 105-1 is part. In these cases, the beacon communication manager 510 may determine if the SSID of the received beacon is the same as the SSID of the IBSS network of which the station 105-1 is part. If so, the beacon communication manager 510 may adjust a TSF stored at the station 105-1 to match a TSF identified in the beacon. The beacon communication manager 510 may instruct the transmitter 515 to transmit a beacon identifying the adjusted TSF at a TBTT identified in the received beacon.

Figure 6:
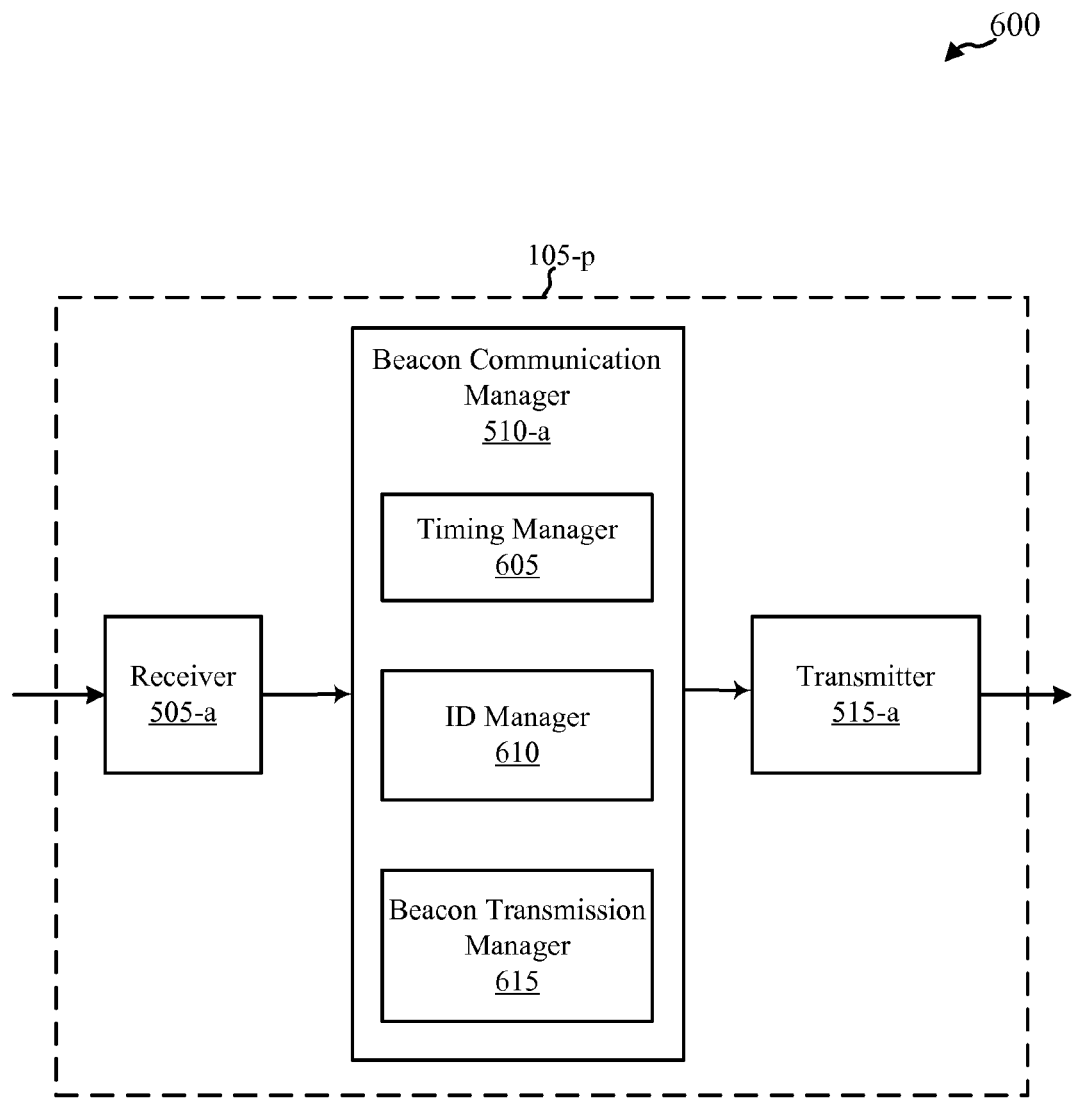
FIG. 6 shows a block diagram of another example of a station, in accordance with various embodiments.

FIG. 6 shows a block diagram 600 of another example of a station 105-*m*, in accordance with various embodiments. In some embodiments, the station 105-*m* may be examples of one or more aspects of the stations 105 and 305 described with reference to FIGS. 1, 2, 3, 4, and/or 5. The station 105-*m* may also be a processor. The station 105-*m* may include a receiver 505-*a*, a beacon communication manager 510-*a*, and/or a transmitter 515-*a*. Each of these components may be in communication with each other.

The components of the station 105-*m* may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver 505-*a* may be or include a radio frequency (RF) receiver, such as an RF receiver operable to receive transmissions in a frequency spectrum used for WLAN communications. The receiver 505-*a* may also, or alternately, include another type of RF receiver, such as a cellular receiver.

The receiver 505-*a* may be used to receive various types of data and/or control signals (i.e., transmissions) over one or more communication links of a wireless communication system, such as one or more communication links of an IBSS such as the IBSS networks 110 described with reference to FIGS. 1, 2, 3, and/or 4. The receiver 505-*a* may also receive beacons, such as one or more beacons 210, 220, 310, 315, 320, 420, and/or 430 described with reference to FIGS. 1, 2, 3, and/or 4.

In some embodiments, the transmitter 515-*a* may be or include an RF transmitter, such as an RF transmitter operable to transmit in a frequency spectrum used for WLAN communications. The transmitter 515-*a* may also, or alternately, include another type of RF receiver, such as a cellular receiver.

The transmitter 515-*a* may be used to transmit various types of data and/or control signals (i.e., transmissions) over one or more communication links of a wireless communication system, such as one or more communication links of an IBSS such as the IBSS networks 110 described with reference to FIGS. 1, 2, 3, and/or 4. The transmitter 515-*a* may also transmit beacons, such as one or more beacons 210, 220, 310, 315, 320, 420, and/or 430 described with reference to FIGS. 1, 2, 3, and/or 4.

The beacon communication manager 510-*a* may be an example of one or more aspects of the beacon communication manager 510 described with reference to FIG. 5, and may in some cases include an ID manager 605, a timing manager 610, and/or a beacon transmission manager 615. Each of these components may be in communication with each other.

In some embodiments, the ID manager 605 may receive an indication of a beacon received at receiver 505-*a*. The ID manager 605 may determine an SSID of the received beacon. If the SSID of the received beacon is a same SSID as the IBSS network of which the station 105-*m* is part, the ID manager 605 may determine whether the received beacon is from within the IBSS network of the station 105-*m* or not. If the ID manager 605 determines that the received beacon is not from the IBSS network (i.e., the beacon originated from a station outside the IBSS network), the ID manager 605 may determine a TSF of the beacon. The ID manager 605 may provide an indication of the TSF of the beacon to the timing manager 610.

In some embodiments, the timing manager 610 may be used to store a TSF of an IBSS network of which the station 105-*m* is part. The TSF may identify a TBTT for the IBSS network and may also provide the beacon transmission manager 615 with information for when a beacon should be transmitted (e.g., at a TBTT of the IBSS network). If the timing manager 610 received an indication of the TSF of the received beacon from the ID manager 605, the timing manager may adjust the stored TSF to approximately match the TSF of the received beacon.

The timing manager 610 adjusts when it will instruct the beacon transmission manager to transmit a beacon based on the receipt of the beacon from the other IBSS network at the receiver 505-*a*. In examples where the station 105-*m* just transmitted a beacon at a current TBTT window of the IBSS network, the station 105-*m* transmits a beacon at the next TBTT despite the fact that the station 105-*m* received the beacon from the other IBSS during the current beacon interval. The timing manager 610 may also adjust a backoff for the station 105-*m* at the next TBTT of the IBSS network. The timing manager 610 may adjust the backoff for the station 105-*m* such that the backoff may be reduced or eliminated at the next TBTT to allow the station 105-*m* a first chance to transmit a beacon identifying the TSF of the other IBSS network.

In some embodiments, the beacon transmission manager 615 may be used to transmit a beacon including the TSF of the current IBSS network. The beacon transmission manager 615 may instruct the transmitter 515-*a* to transmit a beacon at the next TBTT of the IBSS network responsive to the station 105-*m* joining the other IBSS network.

Figure 7:
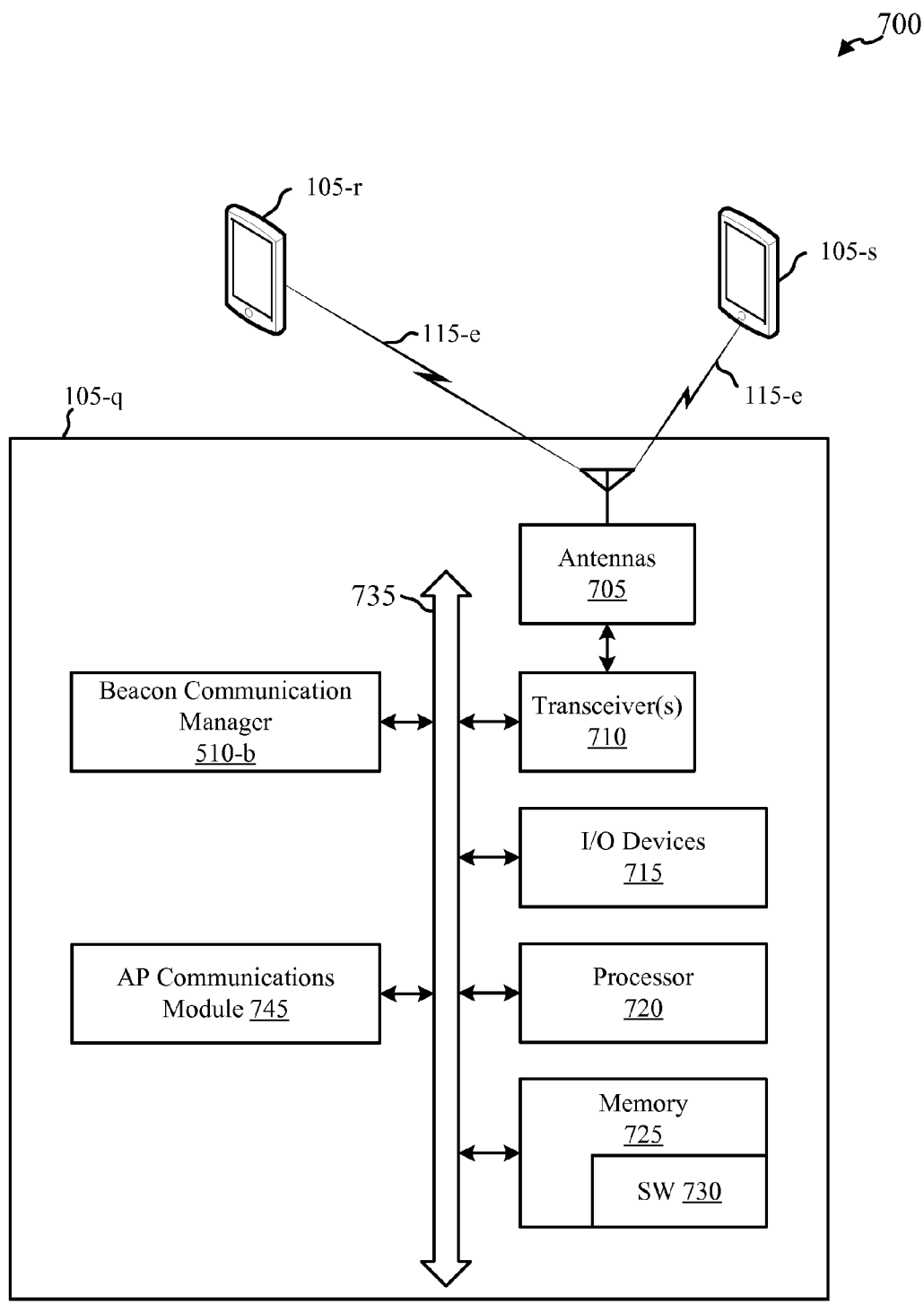
FIG. 7 shows a block diagram block diagram of a device for use in wireless communication, in accordance with various embodiments.

FIG. 7 shows a block diagram 700 of a station 105-*n* for use in wireless communication, in accordance with various embodiments. The station 105-*n* may be configured for merging with another IBSS network within a single beacon interval. The station 105-*n* may be a member of an IBSS network, such as IBSS network 110 described with reference to FIGS. 1, 2, and/or 3. The IBSS network may also include stations 105-*o* and 105-*p*. In some embodiments, the station 105-*n* may be examples of one or more aspects of the stations 105 and 305 described with reference to FIGS. 1, 2, 3, 4, 5, and/or 6.

The station 105-*n* may include antenna(s) 705, one or more transceiver(s) 710, I/O devices 715, a processor 720, and a memory 725, which each may be in communication, directly or indirectly, with each other, for example, via one or more buses 735. The transceiver 710 may be configured to communicate bi-directionally, via the antennas 705, with the stations 105-*o* and/or 105-*p* via communication link 115-*f*. In some embodiments, the transceiver 710 and antennas 705 may be configured to communicate bi-directionally with other devices as well, such as other stations 105 via wired or wireless links, such as any of the communication links 115 of FIG. 1, as described above. The transceiver 710 may include a modem configured to modulate the packets and provide the modulated packets to the antennas 705 for transmission, and to demodulate packets received from the antennas 705. The transceiver 710 may be configured to maintain multiple concurrent communication links using the same or different radio interfaces (e.g., Wi-Fi, cellular, etc.). The station 105-*n* may include a single antenna 705, or the station 105-*n* may include multiple antennas 705. The station 105-*n* may be capable of employing multiple antennas 705 for transmitting and receiving communications in a multiple-input multiple-output (MIMO) communication system.

The station 105-*n* may also include a communications manager 745, which may manage communications with other stations 105, such as stations 105-*o* and 105-*p* as shown in FIG. 7, via the transceiver 710 and antennas 705. The station 105-*n* may have any of various configurations. The station 105-*n* may, in some cases have an internal power supply, such as a small battery, to facilitate mobile operation.

The memory 725 may include random access memory (RAM) and read-only memory (ROM). The memory 725 may store computer-readable, computer-executable software 730 containing instructions that are configured to, when executed, cause the processor 720 to perform various functions described herein. Alternatively, the software 730 may not be directly executable by the processor 720 but be configured to cause the computer (e.g., when compiled and executed) to perform functions described herein. The processor 720 may include an intelligent hardware device, e.g., a central processing unit (CPU), a microcontroller, an application specific integrated circuit (ASIC), etc. In some examples, the memory 725 stores a current TSF of an IBSS network to which the station 105-*n* is connected.

According to the architecture of FIG. 7, the station 105-*n* further includes a beacon communication manager 510-*b*. The beacon communication manager 510-*b* may implement the techniques describe above for merging with another IBSS network that shares a same SSID of the current IBSS network, as described in reference to FIGS. 1-6. By way of example, these components of the station 105-n may be in communication with some or all of the other components of station 105-n via bus 735. Additionally or alternatively, functionality of these components may be implemented via the transceiver 710, as a computer program product stored in software 730, and/or as one or more controller elements of the processor 720. In some embodiments, the beacon communication manager 510-b may be implemented as subroutines in memory 725/software 730, executed by the processor 720. In other cases, these components may be implemented as sub-modules in the processor 720 itself.

Figure 8:
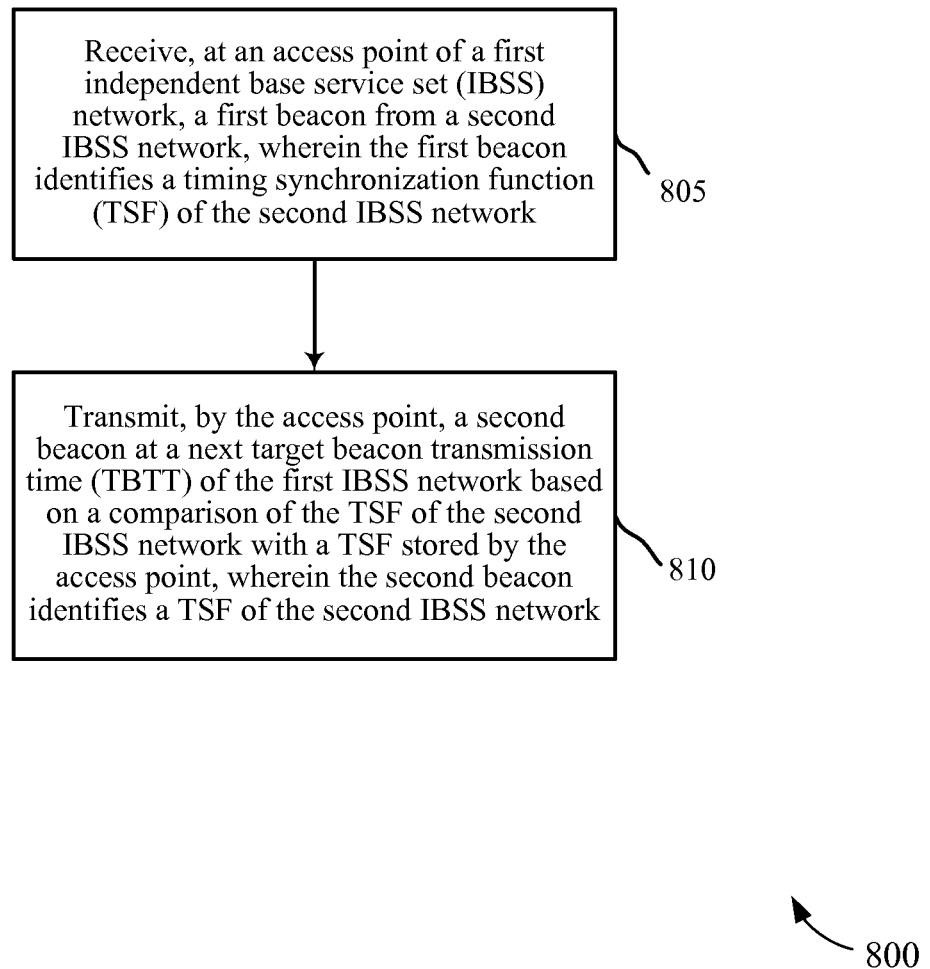
FIG. 8 is a flowchart of a method for a station of one IBSS network to merge with another IBSS network, in accordance with various embodiments.

FIG. 8 is a flowchart of a method 800 for a station of one IBSS network to merge with another IBSS network, in accordance with various embodiments. In some embodiments, the station 105-n may be examples of one or more aspects of the stations 105 and 305 described with reference to FIGS. 1, 2, 3, 4, 5, 6 and/or 7. In some embodiments, the station may be a member of an IBSS network, such as IBSS network 110 described with reference to FIGS. 1, 2, and/or 3.

At block 805, the method may include receiving, at a station of a first IBSS network, a first beacon from a second IBSS network, wherein the first beacon identifies a TSF of the second IBSS network. For example, a station 105-i may be part of a first IBSS network 110-b and receive a first beacon 210 from a second IBSS network 110-a. The first beacon 210 may identify a TSF of the second IBSS network 110-a.

At block 810, the method may include transmitting, by the station, a second beacon at a next TBTT of the first IBSS network based on a comparison of the TSF of the second IBSS network with a TSF stored by the station, wherein the second beacon identifies a TSF of the second IBSS network. For example, the station 105-i may transmit a second beacon 220 at a next TBTT of the first IBSS network 110-b that identifies a TSF of the second IBSS network 110-a. In some examples, the method includes transmitting the second beacon concurrent to a transmission of a third beacon by a second station of the first IBSS network.

In some examples, the method may further include adjusting a backoff window of the station at the next TBTT of the first IBSS network based on the comparison of the TSF of the second IBSS network with the TSF stored by the station.

In some examples, the comparison of the TSF of the second IBSS network with the TSF stored by the station includes determining, by the station (e.g., by a beacon communication manager of the station), that the TSF of the second IBSS network is older than the TSF stored by the station by a threshold duration. If the TSF of the second IBSS network is older than the TSF stored by the station by more than the threshold duration, the station may not update the stored TSF. In examples where the TSF of the second IBSS network is older than the TSF stored by the station by a threshold duration, the method may further include adjusting the TSF stored by the station to an adjusted TSF, wherein the adjusted TSF matches the TSF of the second IBSS network.

In some examples, the method further includes receiving, by the first station, a third beacon from a second station at the TBTT of the first IBSS network, wherein the third beacon identifies the TSF stored by the first station. The method may further include maintaining the adjusted TSF of the first station.

In examples where the station is a first station, the method may further include receiving, at a second station of the first IBSS, the second beacon. The method may also include adjusting, at the second station, a TSF of the second station to match the TSF of the second IBSS network. For example, the second beacon may cause the second station of the first IBSS network to adjust the TSF of the second station to match the TSF of the second IBSS network.

In some examples, the first IBSS network and the second IBSS network share one or both of an SSID and a same BSSID. In some examples, the first IBSS network and the second IBSS network only share a same SSID.

Figure 9:
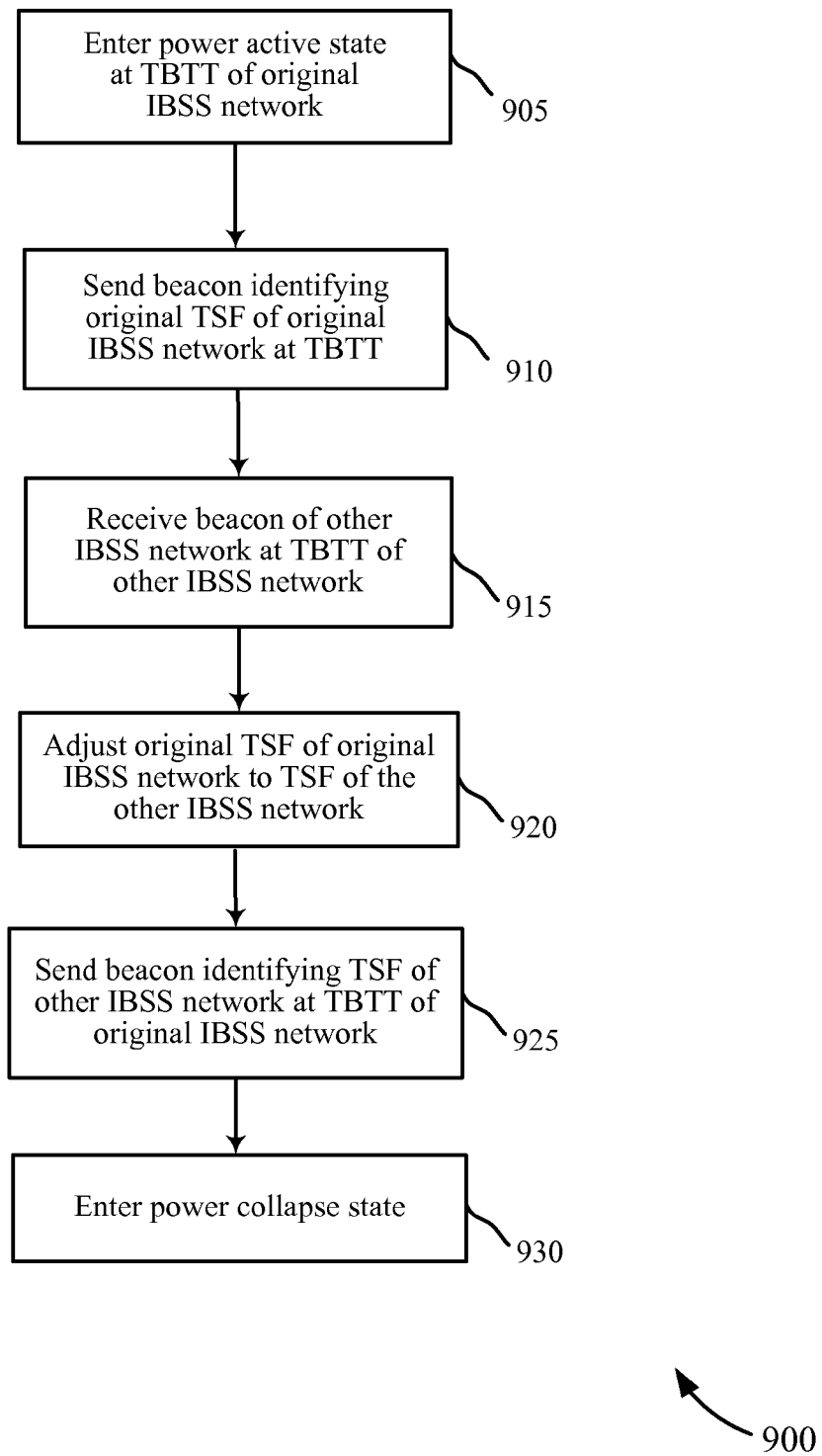
FIG. 9 is a flowchart of another method for a station of one IBSS network to merge with another IBSS network, in accordance with various embodiments.

FIG. 9 is a flowchart of another method 900 for a station of one IBSS network to merge with another IBSS network, in accordance with various embodiments. In some embodiments, the station may be a member of an IBSS network, such as an IBSS network 110 described with reference to FIGS. 1, 2, and/or 3. In some embodiments, the station may be examples of one or more aspects of the stations 105 and 305 described with reference to FIGS. 1, 2, 3, 4, 5, 6 and/or 7. For clarity, the method 900 is described below with reference to the station 305-d as a member of the IBSS network 110-d as shown in FIG. 3. In one implementation, the beacon communication manager 510 described with reference to FIGS. 5, 6, and/or 7 may execute one or more sets of codes to control the functional elements of the station 305-d to perform the functions described below.

At block 905, the station 305-d enters a power active state at a TBTT of the original IBSS network 110-d. The station 305-d may enter the power active state when the TSF indicates the station 305-d is due to broadcast a beacon. At block 910, the station 305-d sends a beacon identifying the original TSF of the original IBSS network 110-d at the TBTT. For example, the station 305-d broadcasts the beacon 315-a at the first instance of TBTT of NW2 330-a. The station 305-d may remain in power active state after transmitting the beacon 315-a.

At block 915, the station 305-d may receive a beacon of another IBSS network at the TBTT of the other IBSS network. For example, the station 305-d may receive the beacon 310-b at time 335. The beacon 310-b may have the same SSID as the IBSS network 110-d and identify a TSF of another IBSS network 110-d. At block 920, the station 305-d may adjust the original TSF stored at the station 305-d for the original IBSS network 110-d to be the TSF of the other IBSS network 110-c.

At block 925, the station 305-d may send a beacon identifying the TSF of the other IBSS network 110-c at the TBTT of the original IBSS network 110-d. This beacon enables other stations in the original IBSS network 110-d to receive the TSF of the other IBSS network 110-c and to join the other IBSS network 110-c. At block 930, the station 305-d may enter the power collapse state.

Figure 10:
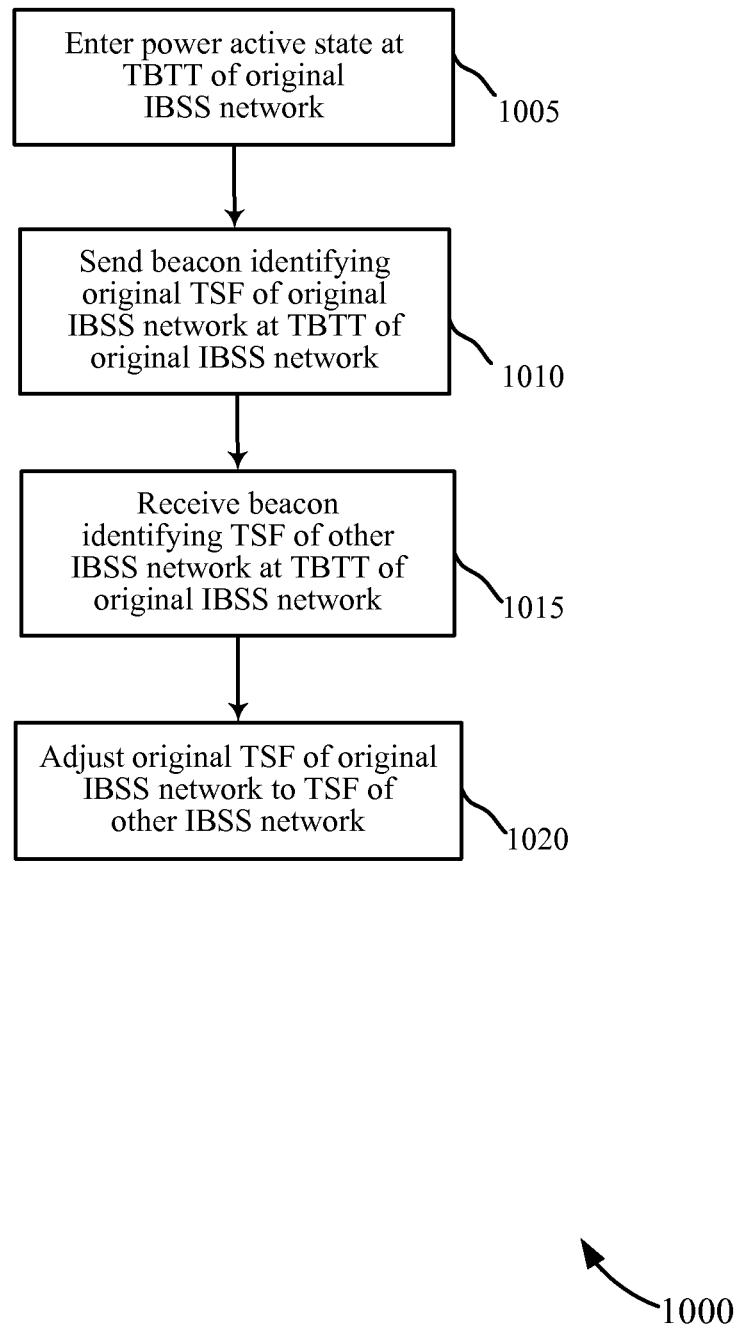
FIG. 10 is a flowchart of a method for a station in an IBSS network to update a timing synchronization function (TSF), in accordance with various embodiments.

FIG. 10 is a flowchart of a method for a station in an IBSS network to update a timing synchronization function (TSF), in accordance with various embodiments. In some embodiments, the station may be a member of an IBSS network, such as an IBSS network 110 described with reference to FIGS. 1, 2, and/or 3. In some embodiments, the station may be examples of one or more aspects of the stations 105 and 305 described with reference to FIGS. 1, 2, 3, 4, 5, 6 and/or 7. For clarity, the method 1000 is described below with reference to the station 305-e as a member of the IBSS network 110-d as shown in FIG. 3. In one implementation, the beacon communication manager 510 described with reference to FIGS. 5, 6, and/or 7 may execute one or more sets of codes to control the functional elements of the station 305-e to perform the functions described below.

At block 1005, the station 305-e enters a power active state at a TBTT of the original IBSS network of which the station 305-e is a member (e.g., IBSS network 110-d). At block 1010, the station 305-e may send a beacon identifying the original TSF of the original IBSS network to which the station 305-e belongs. For example, at the second instance of the TBTT of N2 330-b, the station 305-e broadcasts the beacon 315-b that identifies the TSF of the IBSS network 110-d. Possible concurrently, or shortly before or after, at block 1015, the station 305-e receives a beacon identifying the TSF of another IBSS network at the TBTT of the original IBSS network. For example, the station 305-e receives the beacon 320 broadcast from another member of the IBSS network 110-d.

The station 305-e may confirm that the SSID identified in the beacon 320 is the same as the SSID used at the IBSS network 110-d. If so, at block 1020, the station 305-e may adjust the original TSF of the original IBSS network 110-d to a TSF of the other IBSS network (e.g., IBSS network 110-c). Thus, the station 305-e has joined the other IBSS network.

In sum, a station from a first IBSS network that is in a power active state (e.g., the station had transmitted a beacon at TBTT and did not enter the power collapse state) receives a beacon from a second IBSS network that identifies a TSF of the second IBSS network. The station may determine that the beacon is from a node that is not currently a part of the IBSS network of which the station is a member. The station adjusts the TSF of the first IBSS network to the TSF of the second IBSS network. In some examples, the station adjusts the TSF only when the TSF of the received beacon is older than the stored TSF for the station by a configurable threshold. At the TBTT of the first IBSS network, the station transmits a beacon identifying the TSF of the second IBSS network. All other stations in the first IBSS network may receive the beacon identifying the TSF of the second IBSS network and update the stored TSF accordingly. This way, all other stations of the first IBSS network may merge with the second IBSS network within a single beacon interval.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
receiving, at a station of a first independent basic service set (IBSS) network, a first beacon from a second IBSS network, wherein the first beacon identifies a timing synchronization function (TSF) of the second IBSS network; and
transmitting, by the station, a second beacon at a next target beacon transmission time (TBTT) of the first IBSS network based on a comparison of the TSF of the second IBSS network with a TSF stored by the station, wherein the second beacon identifies a TSF of the second IBSS network.

2. The method of claim 1, further comprising:
adjusting a backoff window of the station at the next TBTT of the first IBSS network based on the comparison of the TSF of the second IBSS network with the TSF stored by the station.

3. The method of claim 1, further comprising:
transmitting the second beacon concurrent to a transmission of a third beacon by a second station of the first IBSS network.

4. The method of claim 1, wherein the comparison of the TSF of the second IBSS network with the TSF stored by the station comprises:
determining, by the station, that the TSF of the second IBSS network is older than the TSF stored by the station by a threshold duration.

5. The method of claim 4, further comprising:
adjusting the TSF stored by the station to an adjusted TSF, wherein the adjusted TSF matches the TSF of the second IBSS network.

6. The method of claim 5, wherein the station is a first station, further comprising:
receiving, by the first station, a third beacon from a second station at the TBTT of the first IBSS network, wherein the third beacon identifies the TSF stored by the first station; and
maintaining the adjusted TSF of the first station.

7. The method of claim 1, wherein the station is a first station, further comprising:
receiving, at a second station of the first IBSS network, the second beacon; and
adjusting, at the second station, a TSF of the second station to match the TSF of the second IBSS network.

8. The method of claim 1, wherein the first IBSS network and the second IBSS network share one or both of a same service set identifier (SSID) and a same basic service set identifier (BSSID).

9. A device for wireless communication, comprising:
a receiver at a station of a first independent basic service set (IBSS) network to receive a first beacon from a second IBSS network, wherein the first beacon identifies a timing synchronization function (TSF) of the second IBSS network; and
a transmitter to transmit a second beacon at a next target beacon transmission time (TBTT) of the first IBSS network based on a comparison of the TSF of the second IBSS network with a TSF stored by the station, wherein the second beacon identifies a TSF of the second IBSS network.

10. The device of claim 9, further comprising:
a timing manager to adjust a backoff window of the station at the next TBTT of the first IBSS network based on the comparison of the TSF of the second IBSS network with the TSF stored by the station.

11. The device of claim 9, wherein the transmitter is further to transmit the second beacon concurrent to a transmission of a third beacon by a second station of the first IBSS network.

12. The device of claim 9, further comprising:
a beacon communication manager to perform the comparison and determine that the TSF of the second IBSS network is older than the TSF stored by the station by a threshold duration.

13. The device of claim 9, further comprising:
a timing manager to adjust the TSF stored by the station to an adjusted TSF, wherein the adjusted TSF matches the TSF of the second IBSS network.

14. The device of claim 13, wherein the station is a first station and the receiver is further to receive a third beacon from a second station at the TBTT of the first IBSS network, wherein the third beacon identifies the TSF stored by the first station; and
wherein the timing manager is further to maintain the adjusted TSF of the first station.

15. The device of claim 9, wherein the station is a first station and the second beacon causes a second station of the first IBSS network to adjust a TSF of the second station to match the TSF of the second IBSS network.

16. The device of claim 9, wherein the first IBSS network and the second IBSS network share one or both of a same service set identifier (SSID) and a same basic service set identifier (BSSID).

17. A computer program product for communication by a wireless communication apparatus in a wireless communication system, the computer program product comprising a non-transitory computer-readable medium storing instructions executable by a processor to cause the wireless communication apparatus to:
receive a first beacon from a first independent basic service set (IBSS) network, wherein the wireless communication apparatus is of a second IBSS network, wherein the first beacon identifies a timing synchronization function (TSF) of the first IBSS network; and
transmit a second beacon at a next target beacon transmission time (TBTT) of the second IBSS network based on a comparison of the TSF of the first IBSS network with a TSF stored by the wireless communication apparatus, wherein the second beacon identifies a TSF of the first IBSS network.

18. The computer program product of claim 17, wherein the instructions are further executable by the processor to cause the wireless communication apparatus to:
determine, by the wireless communication apparatus, that the TSF of the second IBSS network is older than the TSF stored by the wireless communication apparatus by a threshold duration for the comparison; and
adjusting the TSF stored by the wireless communication apparatus to an adjusted TSF, wherein the adjusted TSF matches the TSF of the second IBSS network.

19. The computer program product of claim 18, wherein the wireless communication apparatus is a first wireless communication apparatus and the instructions are further executable by the processor to cause the wireless communication apparatus to:
receive, by the first wireless communication apparatus, a third beacon from a second wireless communication apparatus at the TBTT of the first IBSS network, wherein the third beacon identifies the TSF stored by the first wireless communication apparatus; and maintain the adjusted TSF of the first wireless communication apparatus.

20. The computer program product of claim 17, wherein the station is a first station and the second beacon causes a second station of the first IBSS network to adjust a TSF of the second station to match the TSF of the second IBSS network.

* * * * *